United States Patent
Cui et al.

(10) Patent No.: US 11,553,354 B2
(45) Date of Patent: Jan. 10, 2023

(54) APPARATUSES AND METHODS FOR ENHANCING NETWORK CONTROLS BASED ON COMMUNICATION DEVICE INFORMATION

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Johns Creek, GA (US); Paul Edward Smith, Jr., Rockwall, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 270 days.

(21) Appl. No.: 16/915,115

(22) Filed: Jun. 29, 2020

(65) Prior Publication Data

US 2021/0409965 A1  Dec. 30, 2021

(51) Int. Cl.
| | |
|---|---|
| *H04W 16/18* | (2009.01) |
| *H04W 80/02* | (2009.01) |
| *H04W 8/24* | (2009.01) |
| *H04W 76/11* | (2018.01) |

(52) U.S. Cl.
CPC ............ *H04W 16/18* (2013.01); *H04W 8/24* (2013.01); *H04W 76/11* (2018.02); *H04W 80/02* (2013.01)

(58) Field of Classification Search
CPC ....... H04W 16/18; H04W 80/02; H04W 8/24; H04W 76/11; H04W 72/04; H04W 88/08; H04W 76/00; H04W 16/22
See application file for complete search history.

(56) References Cited

U.S. PATENT DOCUMENTS

| | | | | |
|---|---|---|---|---|
| 8,312,460 | B1* | 11/2012 | Blanding | G06F 9/505 718/104 |
| 8,325,708 | B2* | 12/2012 | Lim | H04M 7/006 370/352 |
| 9,020,535 | B2* | 4/2015 | Clark | H04W 4/02 455/456.3 |
| 11,099,902 | B1* | 8/2021 | Matthews | G06N 20/00 |
| 2004/0233866 | A1* | 11/2004 | Bossoli | H04L 67/06 370/328 |
| 2007/0016528 | A1* | 1/2007 | Verhaegh | G06Q 30/02 705/50 |
| 2008/0147881 | A1* | 6/2008 | Krishnamurthy | H04L 45/02 709/238 |

(Continued)

*Primary Examiner* — Hassan A Phillips
*Assistant Examiner* — Prenell P Jones
(74) *Attorney, Agent, or Firm* — Guntin & Gust, PLC; Ralph Trementozzi

(57) ABSTRACT

Aspects of the subject disclosure may include, for example, transmitting a first identifier associated with a processing system to a communication device, transmitting first data to the communication device, obtaining, from the communication device and based on the transmitting of the first identifier and the first data, a first directive, wherein the first directive directs the processing system to utilize a first radio access technology for a first communication session, and utilizing, based on the first directive, the first radio access technology for the first communication session. Other embodiments are disclosed.

20 Claims, 7 Drawing Sheets

(56) References Cited

U.S. PATENT DOCUMENTS

| | | | | |
|---|---|---|---|---|
| 2015/0365829 | A1* | 12/2015 | Grayson | H04W 16/14 455/454 |
| 2017/0193413 | A1* | 7/2017 | Cole | G06Q 10/06313 |
| 2018/0287696 | A1* | 10/2018 | Barbieri | H04W 36/08 |
| 2020/0015236 | A1* | 1/2020 | Kung | H04W 16/14 |
| 2020/0118143 | A1* | 4/2020 | Sehrawat | G06F 40/30 |
| 2020/0204252 | A1* | 6/2020 | Barbieri | H04W 36/22 |
| 2020/0205166 | A1* | 6/2020 | Huang | H04W 72/0446 |
| 2020/0404720 | A1* | 12/2020 | Zisimopoulos | H04W 76/11 |
| 2021/0007096 | A1* | 1/2021 | Huang | H04L 1/1896 |
| 2021/0014739 | A1* | 1/2021 | Xin | H04W 28/18 |
| 2021/0045178 | A1* | 2/2021 | Kung | H04W 28/0278 |
| 2021/0159727 | A1* | 5/2021 | Flinta | H02J 7/0048 |
| 2021/0378032 | A1* | 12/2021 | Thakolsri | H04W 12/037 |

* cited by examiner

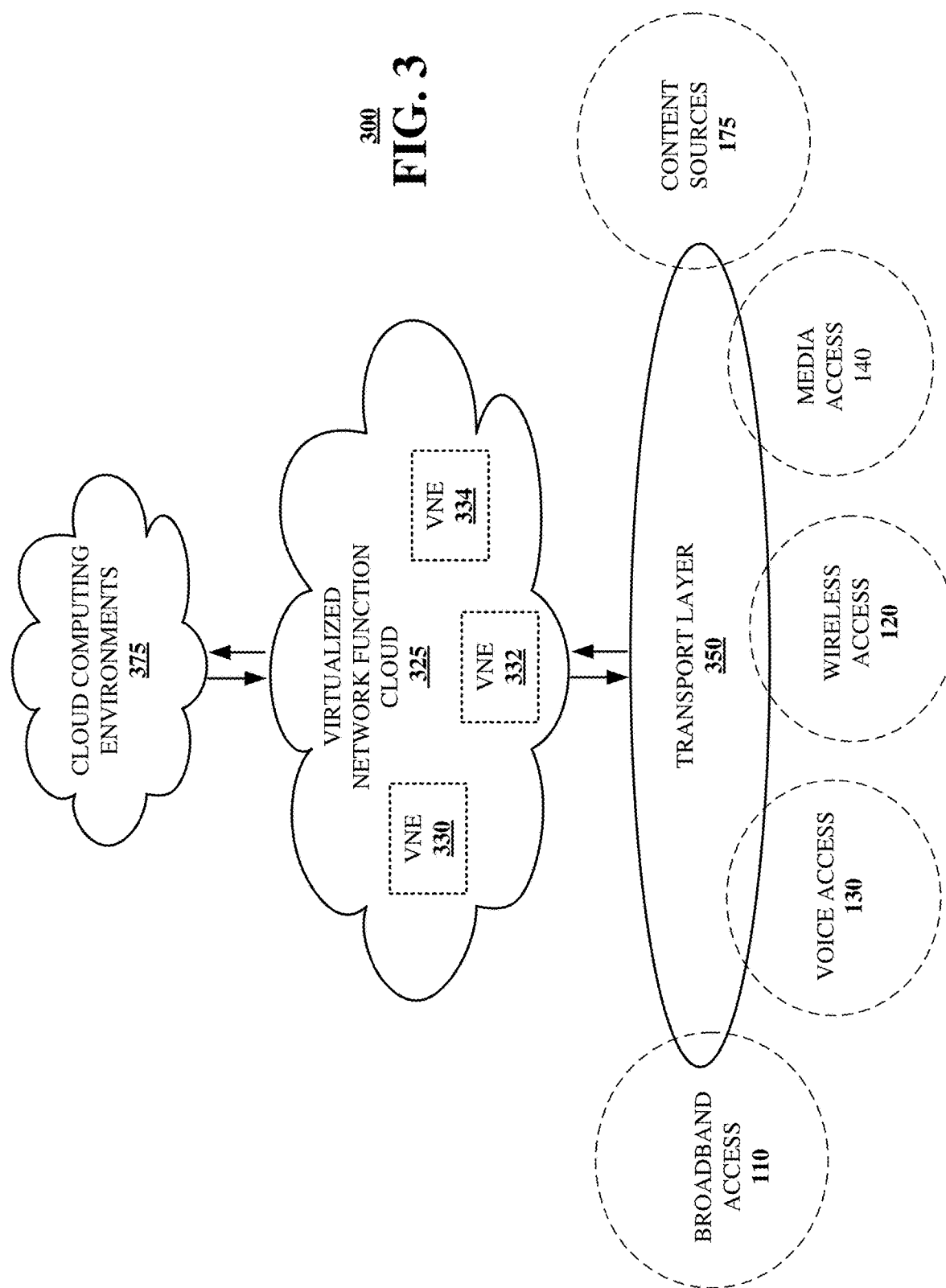

APPARATUSES AND METHODS FOR ENHANCING NETWORK CONTROLS BASED ON COMMUNICATION DEVICE INFORMATION

FIELD OF THE DISCLOSURE

The subject disclosure relates to apparatuses and methods for enhancing network controls based on communication device information.

BACKGROUND

Network operators continue to enhance a scope of geographical coverage that is available via a deployment of additional resources. For example, as access technology evolves from one generation to the next, the geographical area/region that is covered continues to expand. With that expansion, additional opportunities are being generated/created in terms of providing network services to users. However, given the costs associated with deploying, operating, and maintaining network resources (e.g., network infrastructure), in many instances it is impractical to achieve complete (e.g., 100%) coverage. Still further, communication devices can connect to network services via multiple/various access technologies. However, a lack of information regarding the communication devices can lead to poor decision-making/choices regarding access technology utilization.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for expanding/enhancing information or data that is available to decision-making entities/devices in relation to one or more communication systems or networks. Other embodiments are described in the subject disclosure.

One or more aspects of the subject disclosure include, in whole or in part, receiving, over a first network, a first identifier from a first user equipment, receiving over the first network, first data from the first user equipment, identifying a first capability of the first user equipment based on the first identifier, analyzing the first data to generate a first prediction regarding a utilization of a first resource in the first network, generating a first directive based on the first prediction and the first capability, and providing, over the first network, the first directive to the first user equipment, a second user equipment, or a combination thereof.

One or more aspects of the subject disclosure include, in whole or in part, transmitting a first identifier associated with a processing system to a communication device, transmitting first data to the communication device, obtaining, from the communication device and based on the transmitting of the first identifier and the first data, a first directive, wherein the first directive directs the processing system to utilize a first radio access technology for a first communication session, and utilizing, based on the first directive, the first radio access technology for the first communication session.

One or more aspects of the subject disclosure include, in whole or in part, obtaining first data from a first communication device over a network and second data from a second communication device over the network, analyzing the first data and the second data to generate a first prediction regarding a utilization of a resource of the network, and directing, in accordance with the first prediction, the first communication device to engage in a first communication session utilizing a first radio access technology and the second communication device to engage in a second communication session utilizing a second radio access technology.

Figure 1:
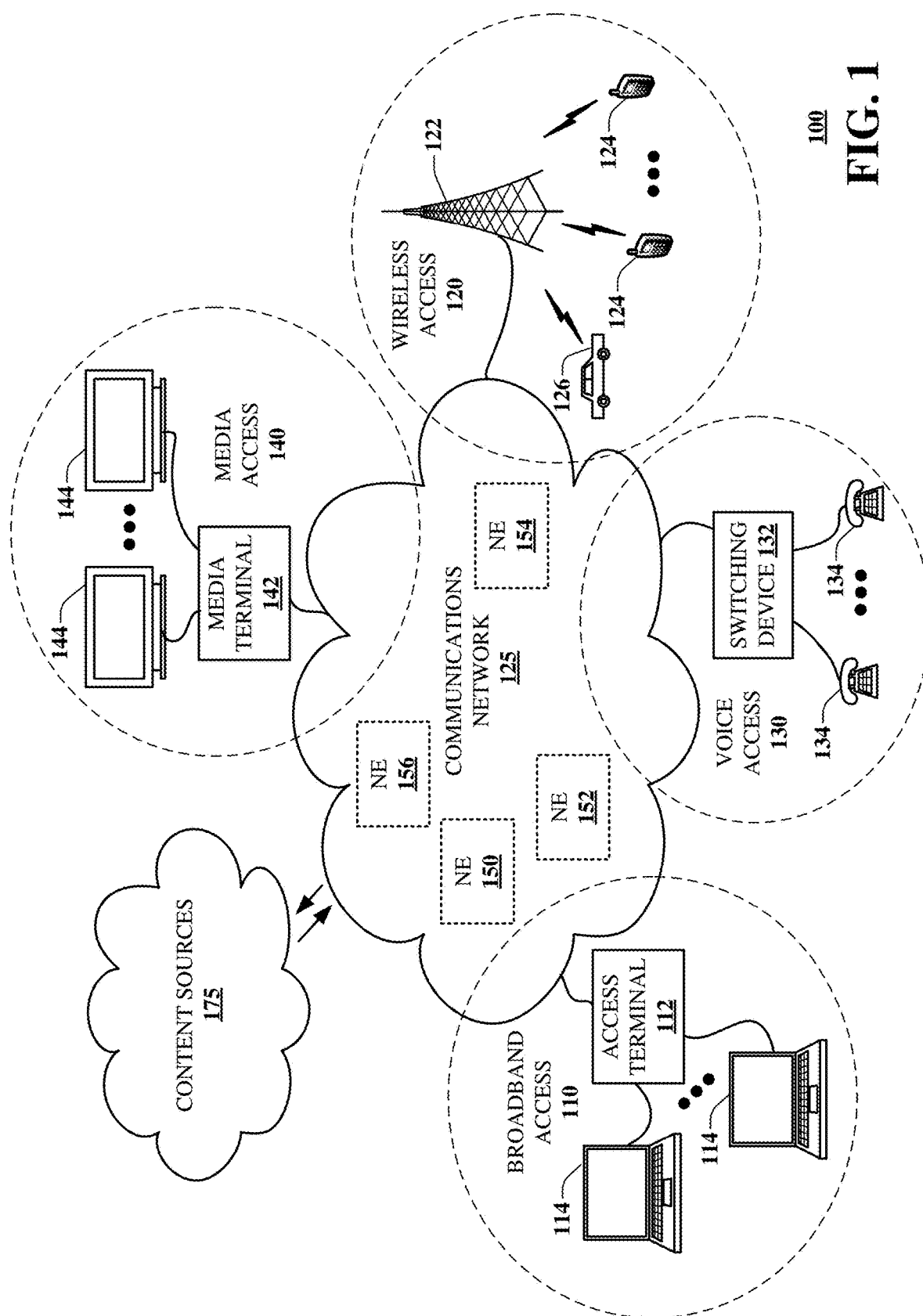
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part receiving a first identifier from a first user equipment, receiving first data from the first user equipment, identifying a first capability of the first user equipment based on the first identifier, analyzing the first data to generate a first prediction regarding a utilization of a first resource in a first network, generating a first directive based on the first prediction and the first capability, and providing the first directive to the first user equipment, a second user equipment, or a combination thereof. System 100 can facilitate in whole or in part transmitting a first identifier associated with a processing system to a communication device, transmitting first data to the communication device, obtaining, from the communication device and based on the transmitting of the first identifier and the first data, a first directive, wherein the first directive directs the processing system to utilize a first radio access technology for a first communication session, and utilizing, based on the first directive, the first radio access technology for the first communication session. System 100 can facilitate in whole or in part obtaining first data from a first communication device and second data from a second communication device, analyzing the first data and the second data to generate a first prediction regarding a utilization of a resource of a network, and directing, in accordance with the first prediction, the first communication device to engage in a first communication session utilizing a first radio access technology and the second communication device to engage in a second communication session utilizing a second radio access technology.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, 6G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, 6G, or higher generation modem, an optical modem and/or other access devices.

In various embodiments, the base station or access point 122 can include a 4G, 5G, 6G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
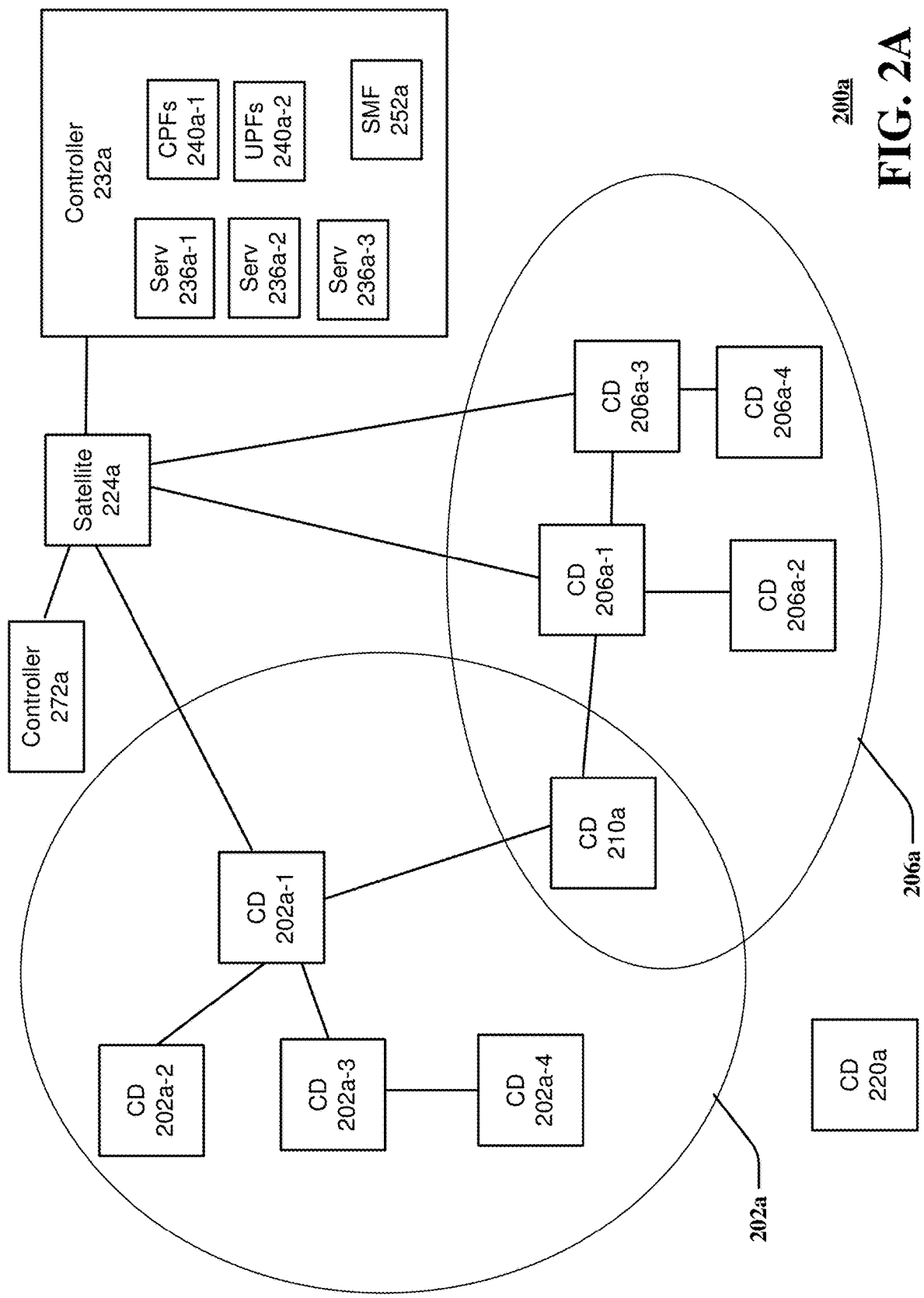
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a. The system 200a may function within, or may be operatively overlaid upon, the system 100 of FIG. 1 in accordance with various aspects described herein. The system 200a may be utilized or operative to extend coverage associated with one or more networks. For example, the system 200a may be utilized to extend coverage associated with a primary network.

As described further below, the system 200a may include one or more communication devices (CDs). In some embodiments, the CDs may include, without limitation, one or more: servers, routers, switches, gateways, modems, desktop computers, laptops, tablets, mobile phones (e.g., smartphones), etc. In some embodiments, a CD may include a sensor. In some embodiments, a CD may include a client device or user equipment (UE).

In some embodiments, a CD may be included/incorporated as part of one or more other devices or apparatuses. For example, a CD may be included as part of one or more vehicles, such as automotive vehicles (e.g., cars, trucks, all-terrain vehicles, etc.), marine craft (e.g., boats, submarines, etc.), cycles (bicycles, etc.), spacecraft (e.g., satellites, rockets, airplanes, helicopters, drones), etc. In some embodiments, a CD may be included as part of an Internet of Things (IoT) device, a robot, etc. Aspects of a CD may be directed to machine learning and/or artificial intelligence in terms of a processing of one or more inputs and a generation of one or more outputs.

At least some of the CDs may be arranged in accordance with one or more clusters/grids. As used herein, a cluster/grid may correspond/refer to an ad-hoc network. An ad-hoc network may extend the coverage associated with one or more other networks, such as a primary network as described above. In this respect, an ad-hoc network may serve as a booster or repeater with respect to one or more signals conveyed by the primary network.

In some embodiments, a cluster and/or a CD may be associated with one or more mobile edge computing (MEC) devices. The use of MEC devices, in relation to a provisioning of access to one or more networks (or services thereof), is described in U.S. patent application Ser. No. 16/699,880 filed on Dec. 2, 2019, and U.S. patent application Ser. No. 16/699,987 filed on Dec. 2, 2019. All sections of each of the aforementioned patent applications are incorporated herein by reference in their entirety.

As shown in FIG. 2A, a first cluster 202a may include CDs 202a-1, 202a-2, 202a-3, and 202a-4. A second cluster 206a may include CDs 206a-1, 206a-2, 206a-3, and 206a-4. A CD 210a may be included in, or associated with, the first cluster 202a and the second cluster 206a, which is to say that a given CD may be a member of more than one cluster at a given point in time.

In some embodiments, one or more clusters may be generated/created and/or disbanded/destroyed at various points in time, which is to say that an existence of a cluster (or a lack thereof) may be dynamic in nature. Clusters may be generated and/or destroyed in response to one or more user-generated inputs, in response to one or more conditions, in response to an occurrence of one or more events, etc. Similarly, clusters may be generated and/or destroyed in response to an absence of one or more user-generated inputs, in response to an absence of one or more conditions, in response to an absence of an occurrence of one or more events, etc. A given CD may join or leave a given cluster based on similar considerations (e.g., may join or leave in accordance with user-generated inputs, conditions, events, etc.). In this respect, the depiction of the first cluster 202a and the second cluster 206a (and the CDs that are respective members thereof) shown in FIG. 2A may be representative of a snapshot in time; e.g., the arrangement of the clusters (and the CDs associated therewith) may be modified (relative to what is shown in FIG. 2A) in accordance with a progression/passage of time.

As referred to above, the system 200a (e.g., one or both of the first cluster 202a and the second cluster 206a) may be used to extend coverage associated with the primary network to, e.g., a CD 220a. For example, and assuming that the CD 220a is located in the wilderness, the primary network might not (directly) reach the CD 220a. In this respect, the extension of the coverage of the primary network obtained via the first cluster 202a and/or the second cluster 206a may facilitate a(n indirect) connection of the CD 220a to the primary network. Stated slightly differently, the first cluster 202a and/or the second cluster 206a may serve as an intermediary with respect to network services of the primary network that the CD 220a may obtain access to via the system 200a.

As represented in FIG. 2A, the first cluster 202a and the second cluster 206a may be operatively connected/coupled to a satellite 224a. For example, operations of the clusters 202a and 206a may be coordinated with respect to one another via the satellite 224a. Such coordination may include an exchange of data or information between the clusters 202a and 206a via the satellite 224a. Alternatively, or additionally, such an exchange of data or information may be facilitated via the CD 210a that is a member of both of the clusters 202a and 206a.

As shown in FIG. 2A, the CD 202a-1 may be directly connected/coupled to the satellite 224a. Within the first cluster 202a, the CDs 202a-2, 202a-3, 202a-4, and 210a may be indirectly connected/coupled to the satellite 224a via the CD 202a-1. The CD 202a-4 may be indirectly connected/coupled to the CD 202a-1 via the CD 202a-3. The CDs 206a-1 and 206a-3 may be directly connected/coupled to the satellite 224a. Within the second cluster 206a, the CD 206a-2 and the CD 210a may be indirectly connected/coupled to the satellite 224a via the CD 206a-1. The CD 206a-4 may be indirectly connected/coupled to the satellite 224a via the CD 206a-3.

A determination of whether a first entity (e.g., a first CD) should share a direct connection/coupling or an indirect connection/coupling with a second entity (e.g., a satellite) may be based on one or more factors or considerations. Such factors or considerations may include: a communication range of the first entity and/or the second entity, a transmission power level of the first entity and/or the second entity, a reception/receiver sensitivity of the first entity and/or the second entity, access technology capabilities of the first entity and/or the second entity, frequency bands associated with the first entity and/or the second entity, an identification of one or more obstructions in a line-of-sight associated with a communication path between the first entity and the second entity, a level of trust between the first entity and the second entity, etc., or any combination thereof. Furthermore, whether the first entity and the second entity share a direct connection or an indirect connection may be based on factors/considerations associated with one or more other entities (e.g., a third entity).

In some embodiments, the organization, arrangement, and/or operations of the CDs within the clusters shown in FIG. 2A may be based on values for one or more parameters. The (values of the) parameters may include: power levels, frequency bands, timeslots, modulation schemes, encoding/decoding schemes, encryption/decryption schemes, multiple-input multiple output (MIMO) schemes, locations, etc., or any combination thereof. The values of the parameters may be static/pre-configured, dynamically assigned, and/or updated/modified in accordance with one or more factors or considerations (such as for example the factors/considerations set forth above). The values of the parameters may be at least partially determined by a controller 232a (where the controller 232a may be referred to, or may correspond to, a radio intelligent controller (RIC)).

In some embodiments, the controller 232a may be associated with backhaul/backlink infrastructure, such that the CDs of the clusters 202a and 206a may be indirectly connected/coupled to the controller 232a via the satellite 224a. However, in some embodiments the controller 232a may be directly connected/coupled to a given CD within a cluster, which is to say that the satellite 224a might not be included in such embodiments.

The controller 232a may facilitate a provisioning of services associated with one or more networks, such as for example the primary network referred to above. In this respect, the controller 232a is shown in FIG. 2A as including a first service (Serv) 236a-1, a second service 236a-2, and a third service 236a-3. The services 236a-1 through 236a-3 may be associated with one or more programs and/or applications that may be at least partially executed by one or more of the CDs and/or the satellite 224a. One or more of the services 236a-1 through 236a-3 may be administered/stored/maintained by the controller 232a, potentially as part of one or more data storage devices (e.g., a database, a memory, etc.), as a micro-service.

The controller 232a may oversee/manage aspects of resource congestion and/or resource availability, potentially as a function of load experienced in the system 200a. In this regard, the controller 232a may be responsible for selecting particular devices or components to provision aspects of a given service (e.g., the first service 236a-1) with respect to one or more of the CDs of the system 200a.

The controller 232a may manage functionality of the system 200a in terms of control plane functions (CPFs) 240a-1 and/or user plane functions (UPFs) 240a-2. For example, the CPFs 240a-1 may incorporate aspects of service level agreements (SLAs), billing, application interfaces (AIs), code exchange technologies, etc. The UPFs 240a-2 may be responsible for obtaining and transferring content/information/data associated with applications executing on a CD.

The controller 232a may include, or be associated with, a network session management function (nSMF, or SMF for short) 252a. The SMF 252a may be responsible for managing/maintaining a first communication session (associated with a requested service) with a given CD. In this respect, the SMF 252a may facilitate a handover of the first communication session from the controller 232a to another controller, e.g., controller 272a. Similarly, the SMF 252a may facilitate a handover of a second communication session from the another controller 272a to the controller 232a.

The SMF 252a may facilitate an establishment of multiple communication sessions using multiple radio access technologies (RATs). Such multiple communication sessions may be executed concurrent with one another. As one skilled in the art will appreciate, a handover and/or an establishment of multiple communication sessions may be initiated based on a variety of factors, such as for example received signal strength indicators (RSSIs), interference levels, noise levels, loads, resource utilization data, power levels (e.g., battery storage capacities), identifications of devices (e.g., make and model numbers), etc.

In some instances, whether a first CD should utilize a first RAT or a second RAT may be dependent on information/data that is stored at/by the first CD. For example, if the first CD is incorporated as part of a vehicle, it might not be prudent to connect the first CD via millimeter-wave (mmW) wavelengths or Terahertz (THz) frequencies in some instances, such as for example if the vehicle is moving at a speed that is greater than a threshold, due to a high probability/likelihood of loss of coverage. In some embodiments, the first CD may share information associated with the first CD (such as, for example, the incorporation of the first CD within the vehicle as described above) with, e.g., the controller 232a to enhance decision-making processes performed by the controller 232a.

In some embodiments, a first CD (e.g., the CD 202a-1) may serve as a signal booster/repeater with respect to a signal transmitted by a second CD (e.g., the CD 202a-2). In this regard, and based on information/data provided by the first CD to, e.g., the controller 232a, the controller 232a may selectively activate/enable the first CD to provide such a signal boost/repeat functionality.

In some embodiments, a first CD may be activated/enabled to perform/take measurements on behalf of a second CD; the first CD may perform/take the measurements and provide information/data indicative of the measurements to, e.g., the second CD and/or the controller 232a.

In at least some of the abovementioned examples, a framework associated with a controller (e.g., the controller 232a) may be extended/enhanced to include information/data that is available at one or more CDs. The controller may incorporate such information/data as part of decision-making processes to enhance resource utilization (e.g., to enhance an efficiency of network resource utilization) and/or enhance a user's quality of experience (QoE).

Figure 2B:
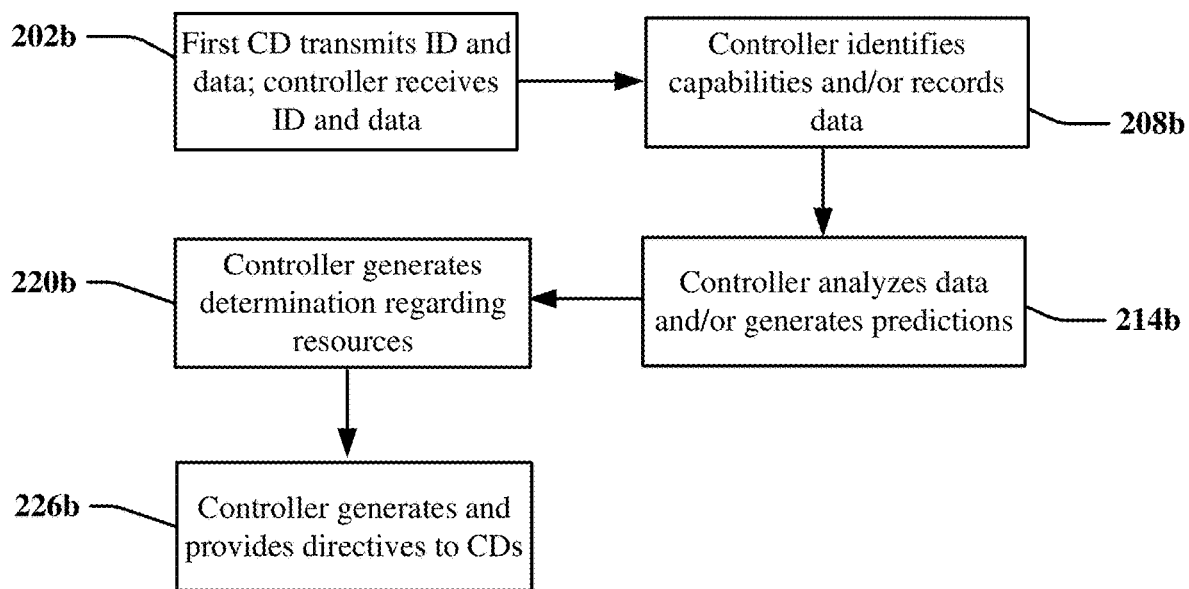
FIG. 2B depicts an illustrative embodiment of a method in accordance with various aspects described herein.

Referring now to FIG. 2B, an illustrative embodiment (e.g., a flowchart) of a method 200b is shown in accordance with various aspects described herein. The method 200b may be partially or wholly executed by one or more systems, devices, and/or components, such as for example the systems, devices, and components set forth herein. To demonstrate, the method 200b may be partially or wholly implemented by the system 200a of FIG. 2A. The method 200b may be executed to enhance decision-making processes in respect of, e.g., network resource utilization.

In block 202b, a first CD may transmit an identifier (ID). The ID may be of the first CD, or a user thereof. For example, the ID may include a MAC address, a serial number, a username and password, a personal identification number (PIN), a biometric identifier of a user (e.g., a facial recognition identifier, a retinal scan, etc.), etc. In some embodiments, the ID of block 202b may include an ID of a second CD (or a user thereof) that the first CD is in communication with.

As part of block 202b, the first CD may transmit data. The data of block 202b may include data measured, determined, calculated, and/received by the first CD. In some embodiments, the data of block 202b may include, or pertain to, radio frequency (RF) conditions, mobility state, service quality, loads (processing loads, signal loads, etc.), power conditions (e.g., battery levels), etc. The ID and/or the data transmitted by the first CD as part of block 202b may be obtained (e.g., received) by one or more other devices or entities, such as for example a controller.

In block 208b, the controller may access a database (or other data storage device) based on the ID(s) of block 202b to identify capabilities associated with the first CD (or another CD identified by the ID). In this respect, the ID(s) of block 202b may be used as an index into a look-up table of capabilities (e.g., access technologies supported, applications supported, etc.) associated with one or more CDs that are supported by a network. Still further, as part of block 208b the controller may record/log the data the controller obtains as part of block 202b, potentially in conjunction with a profile for one or more CDs.

In block 214b, the data may be analyzed by/via one or more algorithms executed by the controller to enhance decision-making processes facilitated by the controller. For example, the data may be analyzed by the controller to identify averages (e.g., average operating points/conditions), departures from typical operations/operating points in an amount greater than one or more thresholds, etc. In some embodiments, and based on the analysis of the data, as part of block 214b the controller may generate predictions regarding: an amount or extent of resource utilization, an availability of network resources, traffic/loads in a network, a probability of a CD engaging in a communication session, a probability of CD mobility (e.g., a probably that a CD will travel to a particular location/destination at a given point in time), etc.

In block 220b, the controller may generate one or more determinations/decisions regarding one or more resources based on the capabilities of block 208b and/or the analysis and/or the predictions of block 214b. For example, as part of block 220b the controller may identify for one or more CDs: one or more access technologies to utilize, power levels (transmission power levels, receiver sensitivity levels, etc.) to utilize, frequency bands to utilize, timeslots to utilize, modulation/demodulation schemes to utilize, encoding/decoding schemes to utilize, encryption/decryption schemes to utilize, multiple-input multiple output (MIMO) schemes to utilize, applications to be utilized/executed, etc. As part of block 220b, the controller may identify one or more ad-hoc networks to generate/create and/or disband/destroy. As part of block 220b, the controller may identify one or more CDs to function as a repeater or signal booster on behalf of one or more other CDs and/or other devices. As part of block 220b, the controller may identify one or more measurements to be performed by a given CD to enhance/augment/supplement the information that is available to the controller.

In block 226b, the controller may issue/provide one or more instructions/directives/directions to one or more CDs. The directives of block 226b may facilitate the determinations/decisions of block 220b. For example, the directives of block 226b may cause the one or more CDs to implement the determinations/decisions of block 220b. In some embodiments, a first CD that receives a first directive may forward the first directive to one or more other CDs and/or may provide a second directive that is based on and/or at least partially different from the first directive to one or more other CDs as part of block 226b.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects or blocks of the method 200b (or one or more portions thereof) may be executed iteratively/repeatedly, potentially as part of one or more algorithms. In some embodiments, an execution of the method 200b (or one or more portions thereof) may incorporate aspects of machine learning and/or artificial intelligence. For example, as the method 200b is executed, and additional information/data is obtained and analyzed, the determinations/decisions made by the controller may tend to become more accurate, and an efficiency in terms of network resource utilization may be enhanced. Still further, aspects of QoE may be enhanced from executing the method 200b. In this respect, as the method 200b is executed over time, any error in the determinations/decisions made by the controller may tend to converge towards zero.

As described herein, aspects of disclosure may facilitate an enrichment in terms of the data or information that is available in decision-making processes. In some embodiments, such data or information may be shared between devices or entities to enhance the decision-making processes. In some embodiments, a first CD may act on behalf of one or more other CDs to implement/execute a given decision/determination.

Aspects of this disclosure may implement one or more specifications or policies (e.g., operator policies, user policies, etc.) in relation to one or more networks or communication systems. In some embodiments, data associated with a network or system may be analyzed to facilitate decision-making processes. In some embodiments, data may be analyzed as part of a background task or algorithm. In some embodiments, data may be analyzed in real-time or substantially in real-time.

In some embodiments, decisions/determinations may be implemented as part of a virtual or augmented reality, combining aspects of physical and virtual worlds. For example, in relation to providing a driver of a vehicle with navigation (e.g., turn-by-turn) directions, one or more virtual objects may be overlaid upon a rendering/representation of a roadway to assist the driver in operating the vehicle.

As described herein, information/data associated with a first CD may be shared with, e.g., a controller and/or one or more other CDs to facilitate decision-making processes and data/information enrichments/enhancements. In some embodiments, a controller (or another device) may serve as a repository of historical/legacy data that may be accessed by one or more CDs. A CD may access the data available at the controller to make decisions/determinations that are of a localized nature (e.g., decisions/determinations that are specific to the CD). To demonstrate, the CD may access the data to select between two different applications or services that facilitate messaging in an area where the CD is currently located; the CD may engage in such messaging based on the selection.

As set forth herein, aspects of this disclosure may be utilized to enhance a coverage of a network. For example, aspects of this disclosure may facilitate a generation/creation of one or more secondary, ad-hoc networks to extend a coverage associated with a primary network. Values of parameters associated with CDs that are included in/compose the secondary network(s) may control/configure the operations of the secondary network(s).

Aspects of this disclosure may create/generate a radio frequency (RF) landscape of CDs. The landscape may be analyzed to identify/select parameters for obtaining radio/network coverage, such as for example an optimized radio/network coverage.

As described herein, aspects of this disclosure may serve to extend a scope of coverage associated with one or more networks (e.g., a primary network). Such an extension of the coverage (from a first scope of coverage to a second scope of coverage that is greater than the first scope of coverage) may correspond to: a geographical extension of coverage, a time-based extension of coverage, or a combination thereof. For example, as set forth herein the use of clusters/grids may serve to reach areas/regions that otherwise were deprived of coverage.

In some embodiments, information or data may be transferred (e.g., transmitted and received) between two or more entities. The information/data may adhere to one or more requirements or specifications. The information/data may be transferred in accordance with a user-generated input, in response to one or more events or conditions (e.g., a loss of connectivity between entities), as a result of a passage of time, etc. A transfer of information or data may adhere to one or more protocols or standards.

Aspects of this disclosure may facilitate one or more communication sessions (e.g., voice, video, audio, data, text, etc.). In some embodiments, a CD may utilize one or more RATs (e.g., may utilize multiple RATs) as part of a communication session.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1 and 2A-2B. For example, virtualized communication network 300 can facilitate in whole or in part receiving a first identifier from a first user equipment, receiving first data from the first user equipment, identifying a first capability of the first user equipment based on the first identifier, analyzing the first data to generate a first prediction regarding a utilization of a first resource in a first network, generating a first directive based on the first prediction and the first capability, and providing the first directive to the first user equipment, a second user equipment, or a combination thereof. Virtualized communication network 300 can facilitate in whole or in part transmitting a first identifier associated with a processing system to a communication device, transmitting first data to the communication device, obtaining, from the communication device and based on the transmitting of the first identifier and the first data, a first directive, wherein the first directive directs the processing system to utilize a first radio access technology for a first communication session, and utilizing, based on the first directive, the first radio access technology for the first communication session. Virtualized communication network 300 can facilitate in whole or in part obtaining first data from a first communication device and second data from a second communication device, analyzing the first data and the second data to generate a first prediction regarding a utilization of a resource of a network, and directing, in accordance with the first prediction, the first communication device to engage in a first communication session utilizing a first radio access technology and the second communication device to engage in a second communication session utilizing a second radio access technology.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
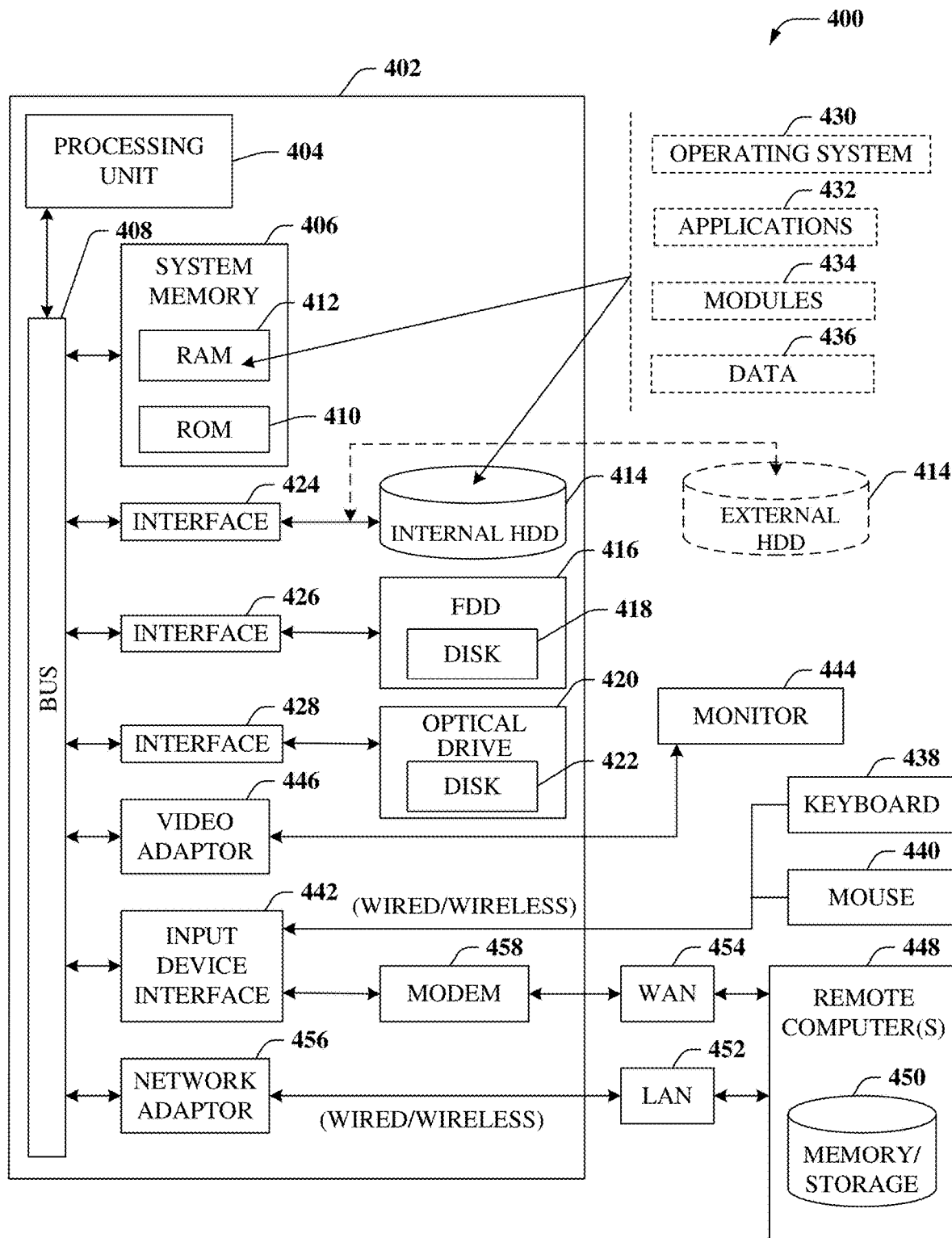
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving a first identifier from a first user equipment, receiving first data from the first user equipment, identifying a first capability of the first user equipment based on the first identifier, analyzing the first data to generate a first prediction regarding a utilization of a first resource in a first network, generating a first directive based on the first prediction and the first capability, and providing the first directive to the first user equipment, a second user equipment, or a combination thereof. Computing environment 400 can facilitate in whole or in part transmitting a first identifier associated with a processing system to a communication device, transmitting first data to the communication device, obtaining, from the communication device and based on the transmitting of the first identifier and the first data, a first directive, wherein the first directive directs the processing system to utilize a first radio access technology for a first communication session, and utilizing, based on the first directive, the first radio access technology for the first communication session. Computing environment 400 can facilitate in whole or in part obtaining first data from a first communication device and second data from a second communication device, analyzing the first data and the second data to generate a first prediction regarding a utilization of a resource of a network, and directing, in accordance with the first prediction, the first communication device to engage in a first communication session utilizing a first radio access technology and the second communication device to engage in a second communication session utilizing a second radio access technology.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
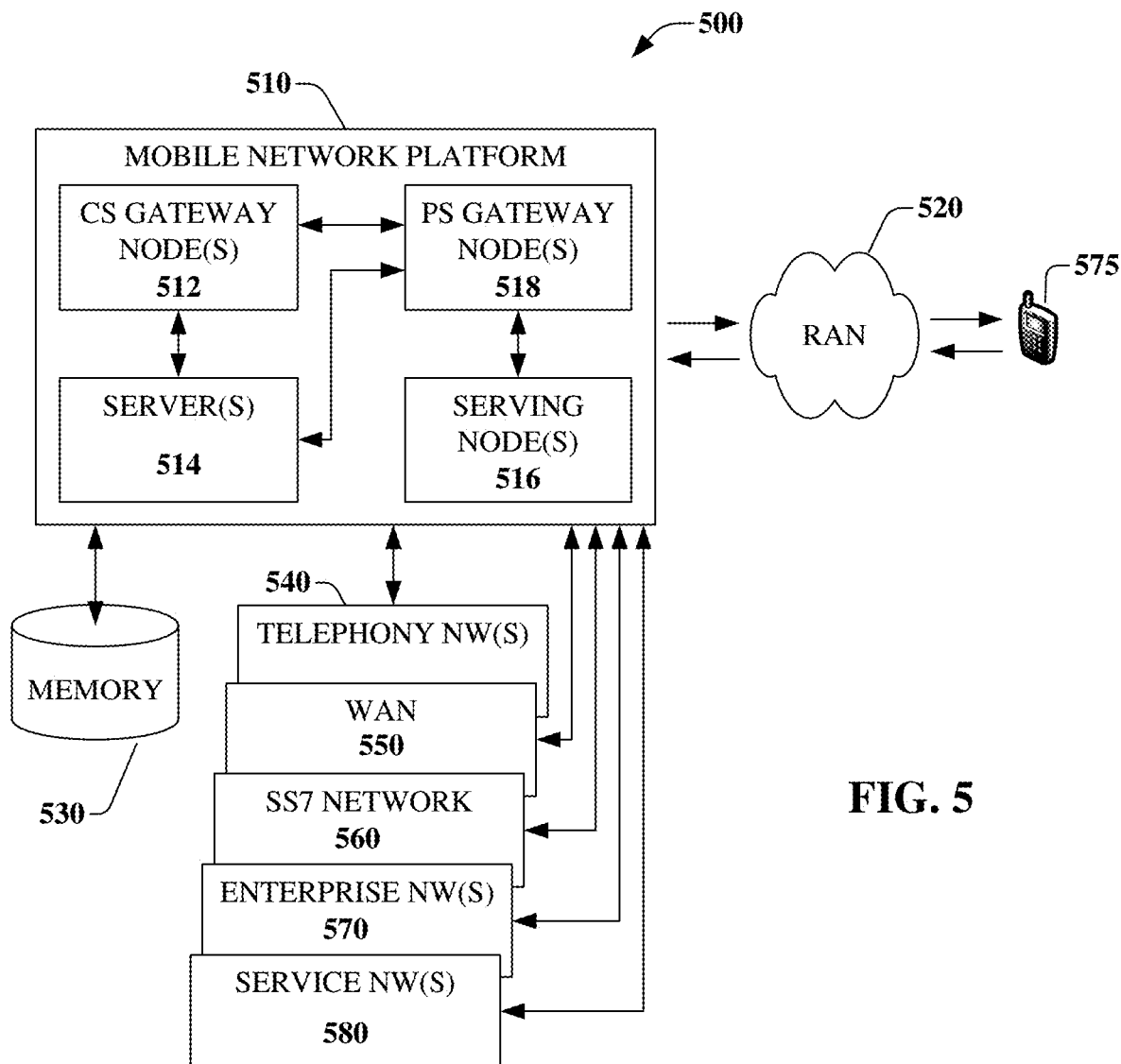
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving a first identifier from a first user equipment, receiving first data from the first user equipment, identifying a first capability of the first user equipment based on the first identifier, analyzing the first data to generate a first prediction regarding a utilization of a first resource in a first network, generating a first directive based on the first prediction and the first capability, and providing the first directive to the first user equipment, a second user equipment, or a combination thereof. Platform 510 can facilitate in whole or in part transmitting a first identifier associated with a processing system to a communication device, transmitting first data to the communication device, obtaining, from the communication device and based on the transmitting of the first identifier and the first data, a first directive, wherein the first directive directs the processing system to utilize a first radio access technology for a first communication session, and utilizing, based on the first directive, the first radio access technology for the first communication session. Platform 510 can facilitate in whole or in part obtaining first data from a first communication device and second data from a second communication device, analyzing the first data and the second data to generate a first prediction regarding a utilization of a resource of a network, and directing, in accordance with the first prediction, the first communication device to engage in a first communication session utilizing a first radio access technology and the second communication device to engage in a second communication session utilizing a second radio access technology.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
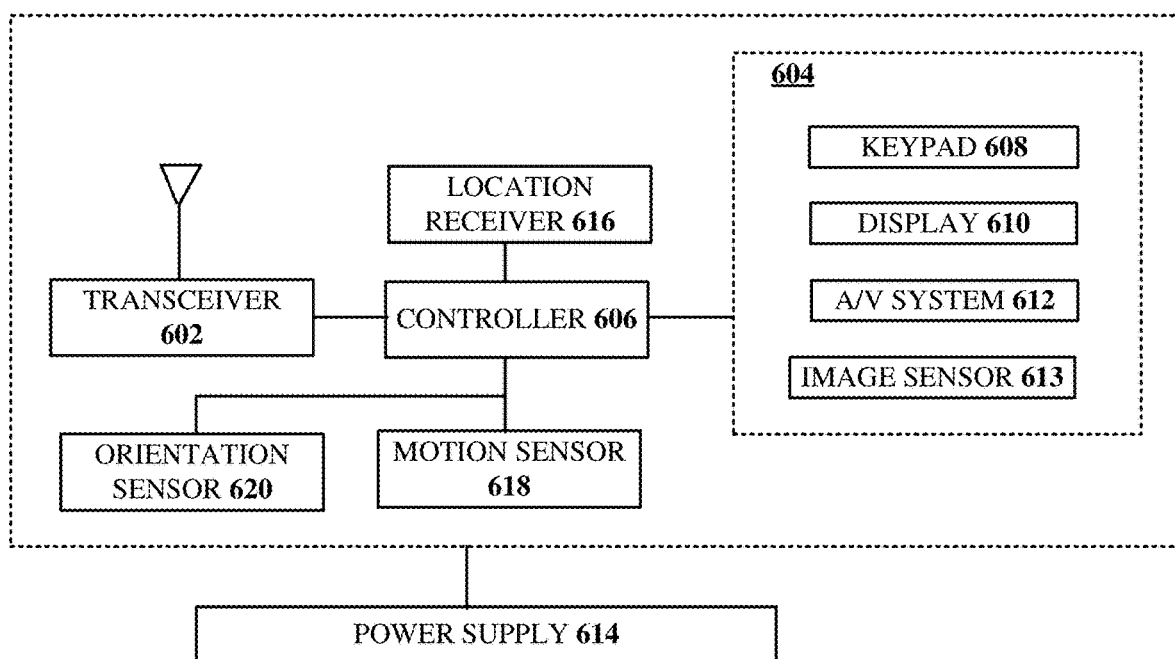
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving a first identifier from a first user equipment, receiving first data from the first user equipment, identifying a first capability of the first user equipment based on the first identifier, analyzing the first data to generate a first prediction regarding a utilization of a first resource in a first network, generating a first directive based on the first prediction and the first capability, and providing the first directive to the first user equipment, a second user equipment, or a combination thereof. Computing device 600 can facilitate in whole or in part transmitting a first identifier associated with a processing system to a communication device, transmitting first data to the communication device, obtaining, from the communication device and based on the transmitting of the first identifier and the first data, a first directive, wherein the first directive directs the processing system to utilize a first radio access technology for a first communication session, and utilizing, based on the first directive, the first radio access technology for the first communication session. Computing device 600 can facilitate in whole or in part obtaining first data from a first communication device and second data from a second communication device, analyzing the first data and the second data to generate a first prediction regarding a utilization of a resource of a network, and directing, in accordance with the first prediction, the first communication device to engage in a first communication session utilizing a first radio access technology and the second communication device to engage in a second communication session utilizing a second radio access technology.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving, over a first network, a first identifier from a first user equipment;
receiving, over the first network, first data from the first user equipment;
identifying a first capability of the first user equipment based on the first identifier;
analyzing the first data to generate a first prediction regarding a utilization of a first resource in the first network;
generating a first directive based on the first prediction and the first capability; and
providing, over the first network, the first directive to the first user equipment, a second user equipment, or a combination thereof.

2. The device of claim 1, wherein the first data originates from the second user equipment.

3. The device of claim 2, wherein the providing of the first directive comprises providing the first directive to the first user equipment.

4. The device of claim 3, wherein the providing of the first directive to the first user equipment causes the first user equipment to provide to the second user equipment: the first directive, a second directive that is at least partially different from the first directive, or a combination thereof.

5. The device of claim 1, wherein the first data originates from the first user equipment.

6. The device of claim 5, wherein the providing of the first directive comprises providing the first directive to the second user equipment.

7. The device of claim 1, wherein the first directive causes the first user equipment to generate a second network, and wherein the second network comprises the second user equipment and a communication device.

8. The device of claim 1, wherein the first directive causes the first user equipment to execute a first application.

9. The device of claim 1, wherein the first capability comprises a radio access technology that is supported by the first user equipment.

10. The device of claim 1, wherein the first identifier comprises a MAC address of the first user equipment, a serial number of the first user equipment, a username and password of a first user of the first user equipment, a personal identification number (PIN) of the first user, a biometric identifier of the first user, or any combination thereof.

11. The device of claim 1, wherein the first data comprises radio frequency condition data, mobility state data, service quality data, load data, power condition data, or any combination thereof.

12. The device of claim 1, wherein the operations further comprise:
storing the first data responsive to the receiving of the first data, resulting in stored first data.

13. The device of claim 12, wherein the operations further comprise:
receiving a request for the first data from the second user equipment or a third user equipment; and
providing the stored first data to the second user equipment or the third user equipment responsive to the request.

14. The device of claim 1, wherein the first resource comprises: an access technology, a power level, a frequency band, a timeslot, a modulation scheme, an encoding scheme, an encryption scheme, a multiple-input multiple output (MIMO) scheme, or any combination thereof.

15. A non-transitory machine-readable medium, comprising executable instructions that, when executed by a processing system including a processor, facilitate performance of operations, the operations comprising:
transmitting, by a first device and over a first network, a first identifier associated with the processing system to a communication device;
transmitting first data to the communication device;
obtaining, from the communication device and based on the transmitting of the first identifier and the first data, a first directive based on a first capability of the first device and a first prediction regarding utilization of a first resource in the first network, wherein the first directive directs the processing system to utilize a first radio access technology for a first communication session; and
utilizing, based on the first directive, the first radio access technology for the first communication session.

16. The non-transitory machine-readable medium of claim 15, wherein the operations further comprise:
obtaining, from the communication device and based on the transmitting of the first identifier and the first data, a second directive that directs the processing system to perform a first measurement;
performing the first measurement responsive to the obtaining of the second directive; and providing a result of the first measurement to the communication device, a second communication device, or a combination thereof.

17. The non-transitory machine-readable medium of claim 15, wherein the operations further comprise:

subsequent to the obtaining of the first directive, transmitting second data to the communication device;

obtaining, from the communication device and based on the transmitting of the second data, a second directive, wherein the second directive directs the processing system to utilize a second radio access technology for a second communication session, wherein the second radio access technology is different from the first radio access technology; and utilizing, based on the second directive, the second radio access technology for the second communication session.

18. A method, comprising:

obtaining, by a processing system including a processor, first data from a first communication device over a network and second data from a second communication device over the network;

determining, by the processing system, a first capability of the first communication device;

analyzing, by the processing system, the first data and the second data to generate a first prediction regarding a utilization of a resource of the network; and directing, by the processing system and in accordance with the first prediction and the first capability, the first communication device to engage in a first communication session utilizing a first radio access technology and the second communication device to engage in a second communication session utilizing a second radio access technology.

19. The method of claim 18, further comprising:

directing, by the processing system and in accordance with the first prediction, the first communication device to engage in the first communication session utilizing a third radio access technology in combination with the first radio access technology.

20. The method of claim 19, further comprising:

obtaining, by the processing system, a value of a first parameter associated with the first communication session;

identifying, by the processing system, a virtual object based on the value of the first parameter; and providing, by the processing system, the virtual object to the first communication device to cause the first communication device to display the virtual object.

* * * * *